July 29, 1969  L. E. GREENLEE  3,458,262

LIGHT MEASURING DEVICE

Filed Oct. 13, 1965

INVENTOR.
Lyman E. Greenlee.

United States Patent Office 3,458,262
Patented July 29, 1969

3,458,262
LIGHT MEASURING DEVICE
Lyman E. Greenlee, Madison, Ind., assignor of one-half to H. Don Forse, Anderson, Ind.
Filed Oct. 13, 1965, Ser. No. 495,397
Int. Cl. G01j 1/44
U.S. Cl. 356—226   6 Claims

ABSTRACT OF THE DISCLOSURE

A light measuring device for use in printing photographs employing a light sensitive resistor, an indicator, and a solid state switching circuit for energizing the indicator in response to a predetermined current flow in the light sensitive resistor.

This invention relates to light measuring devices and more particularly to a right measuring device for use with a photographic enlarger or contact printer.

It is an object of the present invention to provide a device for measuring light intensity in a simple and efficient manner which can be readily used by a photographer who is working in a darkroom.

Another object of the present invention is to provide a light measuring device that is small in size, inexpensive to build and extremely reliable in operation.

Still a further object of this invention is to provide a light measuring device that is rugged and highly resistant to shock and abuse.

Still additional objects, benefits, and advantages of this invention will become evident from a study of the following detailed description taken in conjunction with the accompanying drawing, in which.

Figure 1:
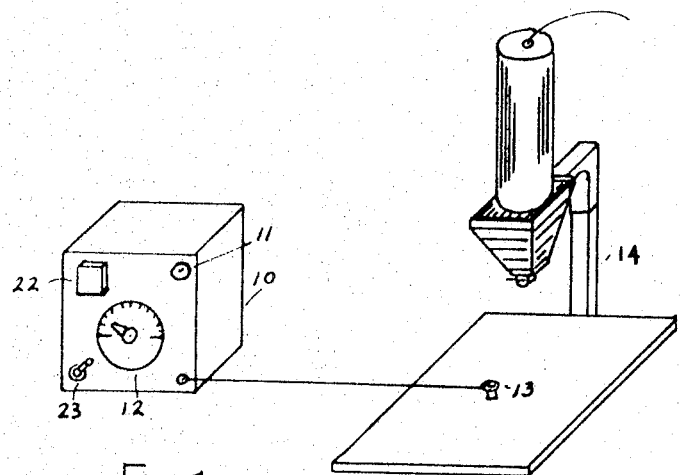
FIGURE 1 is a perspective view of the invention as it might be used to measure the density of a negative in a photographic darkroom.

Referring now specifically to the drawing, in FIG. 1, a light measuring device 10 made in accordance with the present invention is shown to include an indicator lamp 11 which is preferably enclosed by a shield so that only a pinpoint of light is visible to the operator, a buzzer 22, a sensitivity control potentiometer 12, a selector switch 23, and a light sensitive resistor 13. The light sensitive resistor 13 is preferably made very small and is mounted on a magnetic base for easy affixing in position on the easel of enlarger 14.

Figure 2:
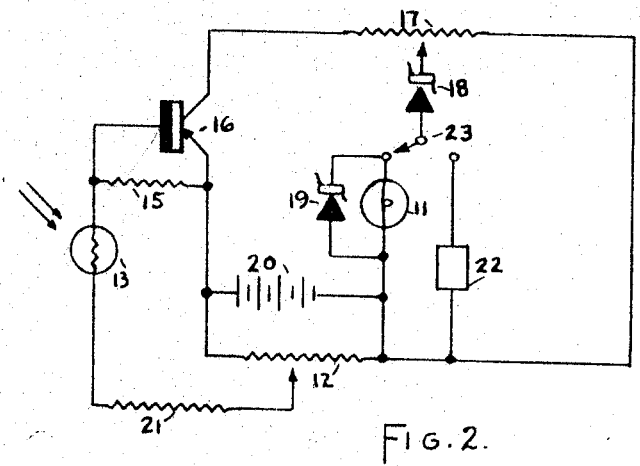
FIGURE 2 is a wiring diagram of the components as they would be assembled to make one form of this invention.

Referring now to FIG. 2 of the drawing: Light sensitive resistor 13 is connected to the base of a semiconductor 16, and through limiting resistor 21 to the movable arm of potentiometer 12, and potentiometer 12 is connected in parallel with battery 20. Stabilizing resistor 15 is connected between the base and emitter of semiconductor 16. Potentiometer 17 is connected between the collector of semiconductor 16 and the negative pole of battery 20. The positive pole of battery 20 is connected to the emitter of semiconductor 16, and to one side of potentiometer 12 and resistor 15. The negative pole of battery 20 in addition to being connected to potentiometers 12 and 17 is also connected to one side of indicator lamp 11 and buzzer 22. These battery polarities apply to a semiconductor device 16 of the PNP type, but for a semiconductor of the NPN type, it is understood that battery polarity must be reversed. Indicator lamp 11 or buzzer 22 is connected through double throw switch 23 to Zener diode 18, which is series connected to the moving arm of potentiometer 17. Zener diode 19 is connected in parallel with indicator lamp 11.

The operation of this device will now be readily understood to be as follows:

A photographer who wishes to use my invention, will first make one or more prints with enlarger 14 from a test negative to determine the proper light level for a perfect print. Next, leaving the light level of enlarger 14 fixed at the level which was used for making the perfect print, he will place the light sensitive resistor 13 on the easel of his enlarger 14. With lamp of enlarger 14 turned on and light focused through the test negative onto the easel, he will move the light sensitive resistor around on the easel to some critical portion of the picture, such as the face of a portrait. By adjusting potentiometer 12, a position will be found where light 11 will just go on, or buzzer 22 will go on. Either light 11 or buzzer 22 may be selected by switch 23. This position of the dial of potentiometer 12 may now be recorded and used as a reference for future exposures.

The action of the circuit of FIG. 2 is as follows: Light sensitive resistor 13 applies a voltage to the base of semiconductor 16 that is adjustable in value by varying the arm of potentiometer 12. As light falling on the light sensitive resistor 13 lowers its resistance, a decreasing voltage appears at the base of semiconductor 16, thus increasing the emitter-to-collector current flow and causing more current to flow through potentiometer 17. This additional current flowing through potentiometer 17 causes the voltage to increase across the combination of Zener diode 18 in series with indicator lamp 11 or buzzer 22, as selected by switch 23. Zener diode 18 remains nonconductive until said voltage reaches a critical "Zener" level. At the critical level, Zener diode 18 suddenly becomes conductive and passes enough current to light lamp 11 or sound buzzer 22. Zener diode 19 remains nonconductive unless the voltage exceeds the safe value for lighting lamp 11, but should said voltage exceed a safe value, Zener diode 19 will conduct to prevent lamp 11 from burning out. Potentiometer 17 is adjusted permanently when the instrument is manufactured to provide the correct voltage range to operate lamp 11 or buzzer 22. Potentiometer 12 is adjusted by the user to increase or decrease the sensitivity of the device to light falling on light sensitive resistor 13. By thus adjusting potentiometer 12 the device may be made to respond to widely varying levels of light intensity.

A photographer who wishes to use my invention with his enlarger has three choices of his method of operation. First, he may use the instrument to measure a given fixed light level from enlarger 14 by adjusting potentiometer 12 which can be precalibrated in terms of different light levels or exposure ranges. Second, he may leave potentiometer 12 set at a fixed position determined from a test negative, as described above, and vary the light intensity by adjusting the lens diaphragm on his enlarger until the light and/or buzzer just goes on. Third, again using a fixed position for potentiometer 12, he may use a voltage control (rheostat) to vary the voltage to the bulb in his enlarger, to increase or decrease the amount of light falling on the light sensitive resistor 13, until the light or buzzer just goes on. His point of best results with any of these three choices will be the point where lamp 11 just lights, or buzzer 22 gives audible warning that the critical light level he needs to make a perfect print has been reached. A photographer may calibrate this light measuring device in terms of his own experience and darkroom processing procedures. Once that he has found the correct light level for making a perfect print, duplicating the results with another negative becomes a matter of adjusting light level or exposure time to the predetermined value.

Having determined the proper light level from enlarger 14 for a perfect print and the corresponding setting of potentiometer 12, as above described, and leaving that setting of potentiometer 12, the correct operating procedure is as follows: The photographer should insert another negative into the carrier of his enlarger 14 and focus the image on the light sensitive resistor 13 which has been placed under some critical area of the negative. Now, with the dial of potentiometer 12 previously correctly set for a good print, he will adjust the diaphragm of his enlarger. First, he will open the diaphragm or adjust the voltage control until the indicator light 11 comes on or the buzzer 22 sounds. Now, he will turn the diaphragm down or adjust the voltage control until the light just goes out or the buzzer just goes off and he is ready to make a perfect print. His use of light 11 or buzzer 22 will depend largely on the type of work he is doing. The buzzer is suitable for color printing, while the light is less annoying for ordinary black-and-white work where it will not affect the pictures. It will readily be seen that this procedure may be carried out in the darkened darkroom since it is the point where the light or buzzer just goes off in response to adjustment of the enlarger diaphragm or voltage control that determines the proper light level. This adjustment can be made in the darkened room since no reading of the previously set potentiometer is necessary.

If a photographer wishes to evaluate a negative prior to making a contact print, he has merely to place the light sensitive resistor 13 against some critical area of his negative as it is illuminated in his contact printer with a fixed light level, set potentiometer 12 for an indication from light 11 or buzzer 22 and take his correct exposure timing reading from the previously calibrated dial of potentiometer 12, as above described.

From the foregoing description it is thus evident that with my invention a photographer may quickly and accurately determine the proper light levels while working in total darkness except for the light from his enlarger, to make prints or enlargements from negatives of widely varying densities with a minimum of error and wasted time and materials.

Having thus completely and fully described the invention, what is now claimed as new and desired to be protected by Letters Patent of the United States is:

1. A light measuring device comprising, in combination, a light sensitive resistor, a source of direct current potential, indicator means for providing an indication in response to a predetermined current flow therein, means including a sensitivity control for coupling said light sensitive resistor to said source for energization thereby, and switching circuit means for coupling said indicator means across said source for energization thereby in response to a predetermined current flow in said light sensitive resistor, said switching circuit means including a transistor coupled to amplify current flowing in said light sensitive resistor and a Zener diode coupled in series with said indicator for energizing the same in response to a predetermined amplified current flow.

2. The device of claim 1 wherein said indicator means comprises a lamp and a buzzer, and further comprising switching means for selectively coupling either said lamp or said buzzer in series with said Zener diode.

3. The device of claim 1 wherein said sensitivity control comprises a potentiometer coupled across said source, said light sensitive resistor being coupled to the movable element of said potentiometer, said transistor having its base element coupled to said light sensitive resistor and its emitter and collector elements coupled between said source and said Zener diode.

4. The device of claim 3 wherein one of the emitter and collector elements of said transistor is coupled to one side of said source, and wherein said switching circuit means includes another potentiometer connected between the other of the emitter and collector elements of said transistor and the other side of said source, said Zener diode and indicator means being coupled in series between the movable element of said other potentiometer and said other side of said source.

5. A light measuring device as set forth in claim 1 wherein a stabilizing resistor is connected between the base and emitter of said transistor.

6. A light measuring device as set forth in claim 5 wherein said Zener diode is connected to the collector of said transistor through the moving arm of a potentiometer which forms the connection from the collector of said transistor to the said source.

References Cited

UNITED STATES PATENTS

| | | |
|---|---|---|
| 2,201,606 | 5/1940 | Bing. |
| 2,897,720 | 8/1959 | Offner. |
| 3,019,700 | 2/1962 | Colman. |
| 3,147,680 | 9/1964 | Stimson. |
| 3,187,224 | 6/1965 | Le Massena _____ 317—16 |
| 3,187,652 | 6/1965 | Kinnard. |
| 3,234,541 | 2/1966 | Paull _____ 340—312 |
| 3,313,939 | 4/1967 | Spencer _____ 250—214 X |
| 3,373,291 | 3/1968 | Peterson et al. _____ 307—202 |

OTHER REFERENCES

Basic Shunt Protection in Silicon Zener Diode and Rectifier Handbook, Motorola, Inc., Phoenix, Ariz., 1961, pp. 86–87.

Schematic of the Fotoval Computer in Heathkit Assembly Manual for Fotoval Computer, Heath Co., Benton Harbor, Mich., © 1964, addition to p. 39; also: FIG. 6 on p. 21, item # 3.

Heathkit Fotoval advertisement in Popular Photography, vol. 55, No. 8, p. 23, August 1964.

RONALD L. WIBERT, Primary Examiner

R. J. WEBSTER, Assistant Examiner

U.S. Cl. X.R.

307—318; 317—16, 31; 355—68